US012646190B2

(12) United States Patent　(10) Patent No.: US 12,646,190 B2
Xu et al.　(45) Date of Patent: Jun. 2, 2026

(54) IDENTIFICATION AND FUSION OF SUPER PIXELS AND SUPER VOXELS CAPTURED BY TIME-OF-FLIGHT SENSORS

(71) Applicant: GM Cruise Holdings LLC, San Francisco, CA (US)

(72) Inventors: Zhanping Xu, Sunnyvale, CA (US); Kartheek Chandu, Dublin, CA (US); Robert Vets, Seattle, WA (US); Brandon S. Seilhan, San Ramon, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 192 days.

(21) Appl. No.: 18/480,056

(22) Filed: Oct. 3, 2023

(65) Prior Publication Data

US 2025/0111528 A1　Apr. 3, 2025

(51) Int. Cl.
| | |
|---|---|
| *G06T 7/521* | (2017.01) |
| *G06V 10/70* | (2022.01) |
| *G06V 10/80* | (2022.01) |
| *G06V 20/58* | (2022.01) |

(52) U.S. Cl.
CPC .............. *G06T 7/521* (2017.01); *G06V 10/70* (2022.01); *G06V 10/806* (2022.01); *G06V*

20/58 (2022.01); *G06T 2207/10028* (2013.01); *G06T 2207/30252* (2013.01)

(58) Field of Classification Search
CPC ........... G06T 7/521; G06T 2207/10028; G06T 2207/30252; G06V 10/806; G06V 20/58; G06V 10/70
See application file for complete search history.

(56) References Cited

U.S. PATENT DOCUMENTS

| | | | | |
|---|---|---|---|---|
| 10,921,817 B1 * | 2/2021 | Kangaspunta | ......... | G06V 20/56 |
| 11,328,517 B2 * | 5/2022 | Vaquero Gomez | .... | G06V 20/10 |
| 11,748,909 B2 * | 9/2023 | Srinivasan | ............. | G06V 20/58 |
| | | | | 382/155 |
| 12,165,367 B2 * | 12/2024 | Sugio | ........................ | G06T 7/75 |

* cited by examiner

*Primary Examiner* — Gregory M Desire
(74) *Attorney, Agent, or Firm* — Honigman LLP; Matthew H. Szalach; Jonathan P. O'Brien

(57) ABSTRACT

Systems and techniques are provided for processing image data from a time-of-flight sensor. An example method includes receiving a depth map and a two-dimensional image that each correspond to an image frame captured by a time-of-flight (ToF) sensor; identifying a plurality of pixels within the two-dimensional image that correspond to at least one scene element; identifying, based on the plurality of pixels, a plurality of voxels within the depth map that correspond to the at least one scene element; and grouping the plurality of voxels into a super voxel that corresponds to the at least one scene element.

20 Claims, 10 Drawing Sheets

900

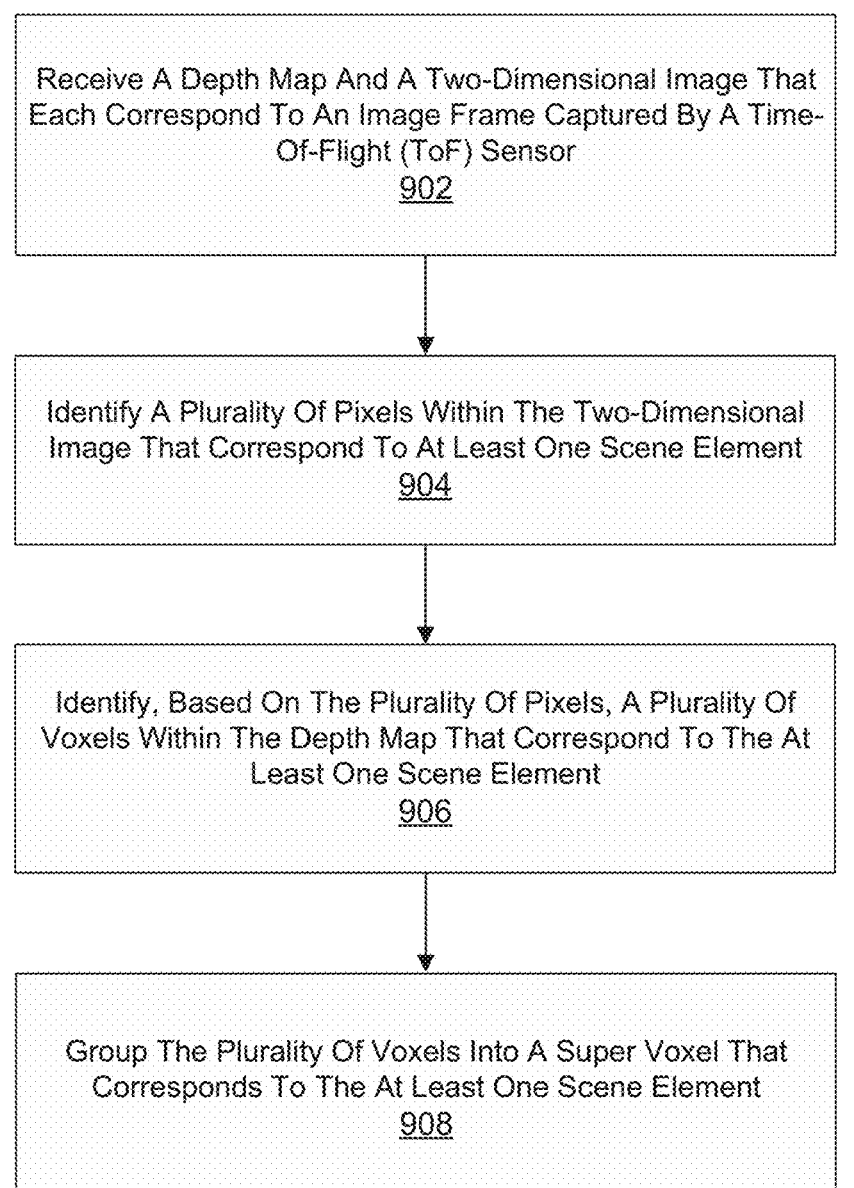

Receive A Depth Map And A Two-Dimensional Image That Each Correspond To An Image Frame Captured By A Time-Of-Flight (ToF) Sensor
902

Identify A Plurality Of Pixels Within The Two-Dimensional Image That Correspond To At Least One Scene Element
904

Identify, Based On The Plurality Of Pixels, A Plurality Of Voxels Within The Depth Map That Correspond To The At Least One Scene Element
906

Group The Plurality Of Voxels Into A Super Voxel That Corresponds To The At Least One Scene Element
908

FIG. 9

IDENTIFICATION AND FUSION OF SUPER PIXELS AND SUPER VOXELS CAPTURED BY TIME-OF-FLIGHT SENSORS

BACKGROUND

1. Technical Field

The present disclosure generally relates to autonomous vehicles and, more specifically, to systems and techniques for detecting and fusing super pixels and super voxels obtained using time-of-flight sensors.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 9 is a flowchart illustrating an example process for processing image data from a ToF camera to identify super pixels and super voxels, in accordance with some examples of the present disclosure.

DETAILED DESCRIPTION

Figure 1:
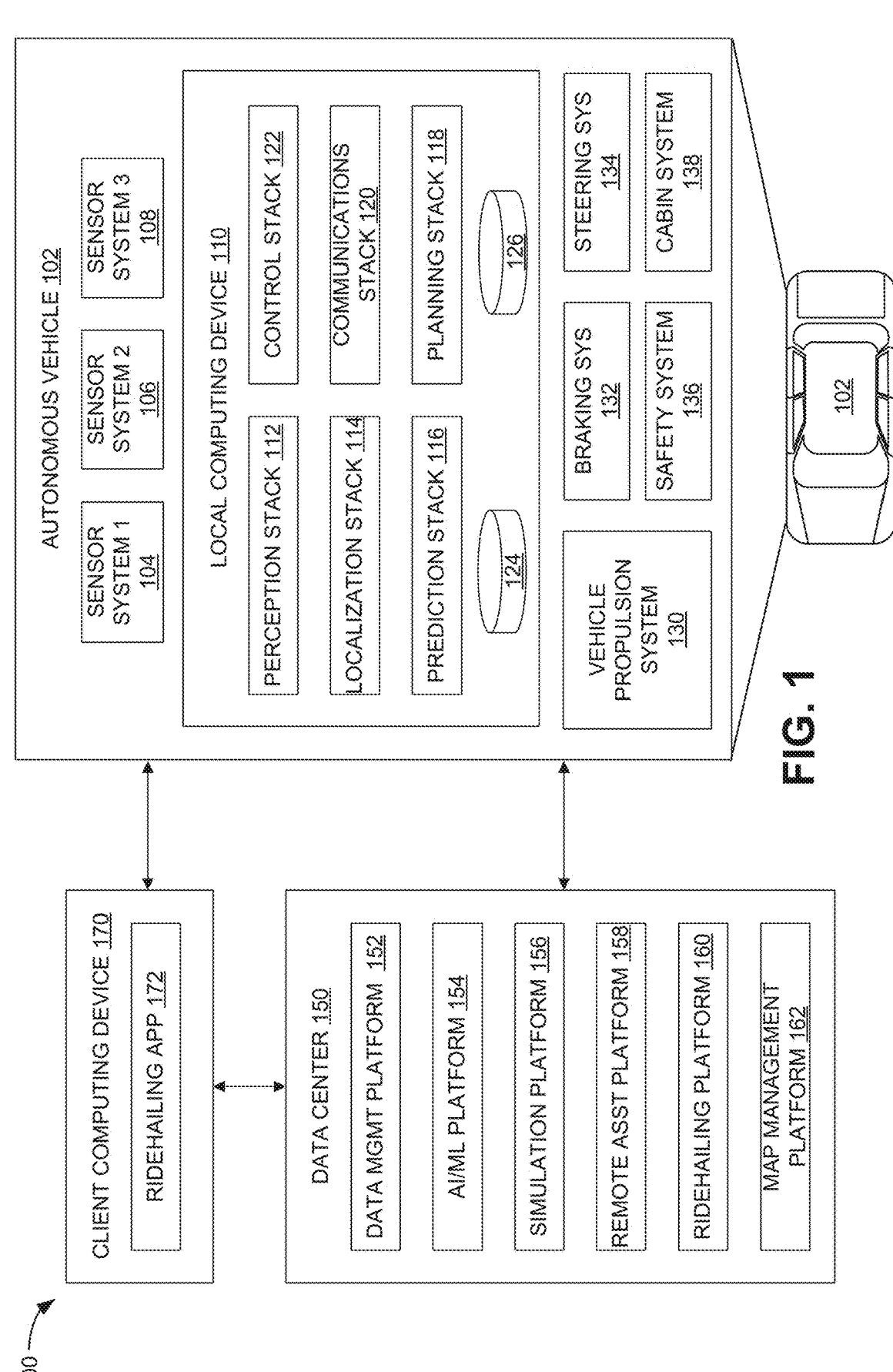
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

In some cases, an AV may use a time-of-flight (e.g., time-of-flight camera) to measure distance to one or more objects in an environment of the AV. For example, depth data of objects in the environment can be determined based on frames (e.g., images or image frames) that are captured by a time-of-flight sensor. In some cases, the frames or images may be recorded using a temporally patterned illumination profile with a temporally coded aperture (e.g., blinking pixels). Depending on the intensity measurements, the images can be combined to form a depth map or depth image that can be used to determine distance to an object.

However, in some cases, processing and segmentation of the point cloud can require significant computing resources and/or time. For example, the point cloud may include interference from "ghost point" clouds that may be caused by bad data due to mis-mapping.

Systems and techniques are provided herein for processing sensor data from a Time-of-Fight camera to identify super pixels and super voxels. In some aspects, two-dimensional data can be used by a machine learning model to identify scene elements. In some cases, the machine learning model can identify a group of pixels (e.g., a super pixel) within the 2D image that corresponds to the scene element.

In some examples, the super pixel can be used to index pixels within the 3D image data (e.g., depth map) to identify a super voxel that corresponds to the scene element.

FIG. 1 is a diagram illustrating an example autonomous vehicle (AV) management system 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SO-NAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102: communicating with the data center 150, the client computing device 170, and other systems: receiving inputs from riders, passengers, and other entities within the AV's environment: logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridehailing service (e.g., a ridesharing service), a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridehailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridehailing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridehailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridehailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridehailing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162): modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridehailing platform 160 can interact with a customer of a ridehailing service via a ridehailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 172. The client computing device 170 can be a customer's mobile computing device or a computing device integrated with the AV 102 (e.g., the local computing device 110). The ridehailing platform 160 can receive requests to pick up or drop off from the ridehailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some aspects, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridehailing platform 160 may incorporate the map viewing services into the ridehailing application 172 to enable passengers to view the AV 102 in transit en route to a pick-up or drop-off location, and so on.

While the autonomous vehicle 102, the local computing device 110, and the AV management system 100 are shown to include certain systems and components, one of ordinary skill will appreciate that the autonomous vehicle 102, the local computing device 110, and/or the AV management system 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 10.

Figure 2:
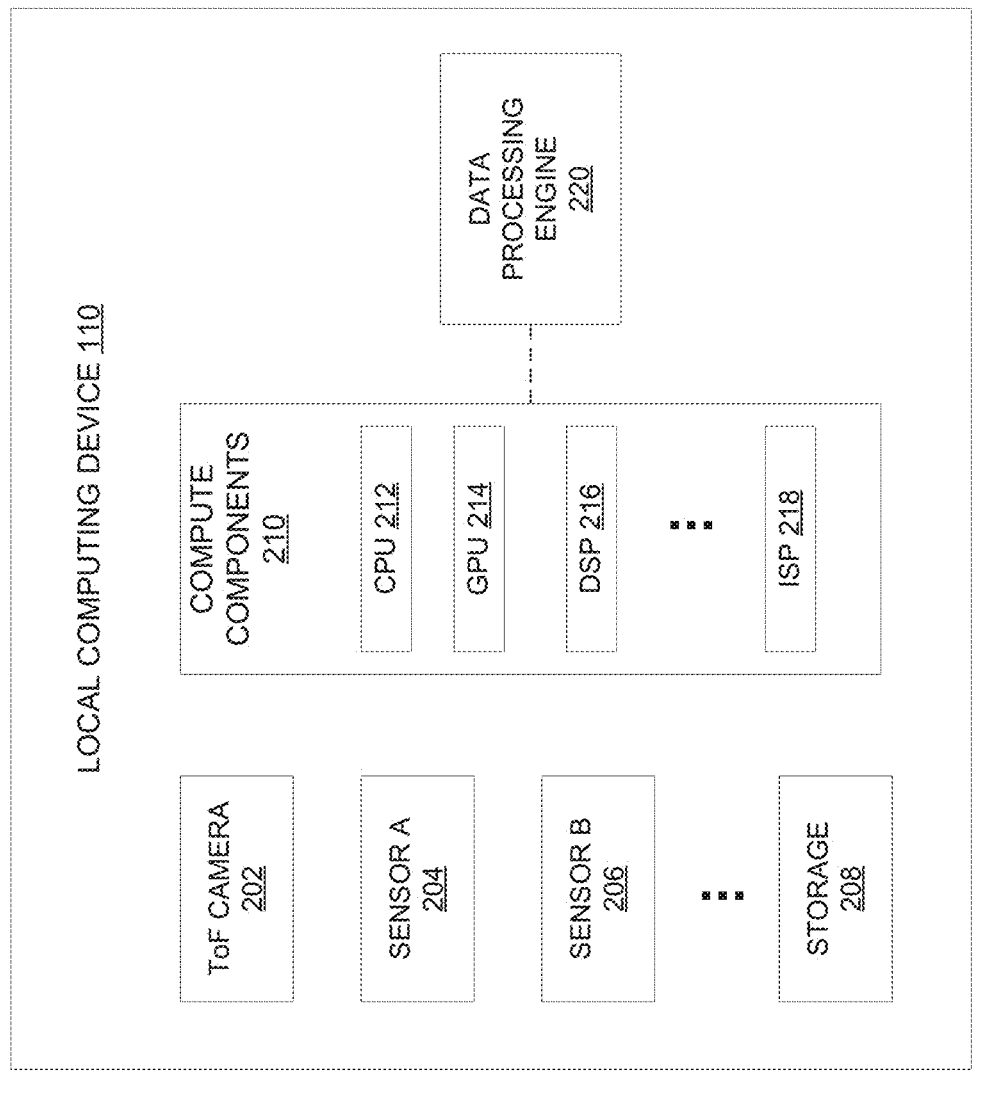
FIG. 2 is a block diagram illustrating an example of an electronic device used to capture sensor data, in accordance with some examples of the present disclosure.

FIG. 2 is a diagram illustrating an example of an electronic device used to capture sensor data. In this example, the electronic device includes or represents the local computing device 110 shown in FIG. 1. However, in other examples, the electronic device can include or represent any other device used to capture and process sensor data as further described herein.

In some examples, local computing device 110 can be configured to perform 3D image signal processing. In some aspects, local computing device 110 can be configured to provide one or more functionalities such as, for example, imaging functionalities, image processing functionalities, 3D image filtering functionalities, image data segmentation functionalities, depth estimation functionalities, phase unwrapping functionalities, AV perception detection functionalities (e.g., object detection, pose detection, face detection, shape detection, scene detection, etc.), extended reality (XR) functionalities (e.g., localization/tracking, detection, classification, mapping, content rendering, etc.), device management and/or control functionalities, autonomous driving functionalities, computer vision, robotic functions, automation, and/or any other computing functionalities.

In the illustrative example shown in FIG. 2, local computing device 110 can include a Time-of-Flight (ToF) camera 202 (also referred to as ToF sensor) and one or more sensors such as sensor A 204 and sensor B 206 (similar to sensor systems 104-108 as illustrated in FIG. 1). In some examples, ToF camera 202 can be a 3D ToF camera system, which is configured to create a 3D image of a scene or object (e.g., 3D point cloud or depth map). Non-limiting examples of the one or more sensors (e.g., sensor A 204 and/or sensor B 206) can include a camera, an ultrasonic sensor, an IMU, a depth sensor using any suitable technology for determining depth (e.g., based on ToF, structured light, or other depth sensing technique or system), a touch sensor, a LiDAR sensor, a RADAR sensor, a microphone, etc.).

In some examples, ToF camera 202 and/or one or more sensors (e.g., sensor A 204 or sensor B 206) can capture image data and generate frames based on the image data and/or provide the image data or frames to one or more compute components 210 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In the illustrative example of FIG. 2, local computing device 110 can include storage 208, which comprises any storage device(s) for storing data such as, for example and without limitation, image data, posture data, scene data, user data, preferences, etc. In some examples, storage 208 can store data from any of the components of local computing device 110. For example, storage 208 can store data or measurements from any of ToF camera 202, one or more sensors (e.g., sensor A 204, sensor B 206, etc.), compute components 210 (e.g., processing parameters, outputs, video, images, segmentation maps/masks, depth maps, filtering results, confidence maps, masks, calculation results, detection results, etc.), data processing engine 220, and/or any other components. In some examples, storage 208 can include a buffer for storing data (e.g., image data, posture data, etc.) for processing by compute components 210.

In some cases, local computing device 110 can include one or more compute components 210 such as a central processing unit (CPU) 212, a graphics processing unit (GPU) 214, a digital signal processor (DSP) 216, an image signal processor (ISP) 218, etc. In some aspects, local computing device 110 can use one or more compute components 210 to perform various computing operations such as, for example, image processing functionalities, precision predictions of image data as described herein, autonomous driving operations, extended reality operations (e.g., tracking, localization, object detection, classification, pose estimation, mapping, content anchoring, content rendering, etc.), detection (e.g., face detection, object detection, scene detection, human detection, etc.), image segmentation, device control operations, image/video processing, graphics rendering, machine learning, data processing, modeling, calculations, computer vision, and/or any other operations.

In some cases, one or more compute components 210 can perform image/video processing, machine learning, depth estimation, XR processing, device management/control, detection (e.g., object detection, face detection, scene detection, human detection, etc.), super pixel detection, super voxel detection, fusion of super pixels and super voxels, 3D model reconstruction, and/or other operations as described herein using data from ToF camera 202, one or more sensors (e.g., sensor A 204, sensor B 206, etc.), storage 208, and/or any other sensors and/or components. In some examples, one or more compute components 210 can implement one or more software engines and/or algorithms such as, for example, data processing engine 220 or algorithm as described herein. In some cases, one or more compute components 210 can implement one or more other or additional components and/or algorithms such as a machine learning model(s), a computer vision algorithm(s), a neural network(s), and/or any other algorithm and/or component.

In some aspects, data processing engine 220 can implement one or more algorithms and/or machine learning models configured to generate depth estimates, generate depth standard deviation, perform image processing, etc., as further described herein. In some examples, data processing engine 220 can be configured to detect and/or identify super pixels (e.g., a group of pixels) in a 2D image that correspond to an object or an element in a scene. In some cases, data processing engine 220 can be configured to detect and/or identify super voxels (e.g., a group of voxels) in a depth map and/or a point cloud that correspond to an object or an element in a scene. In some aspects, a super voxel can be identified by indexing a super pixel.

In some aspects, local computing device 110 can be part of, or implemented by, a single computing device or multiple computing devices. In some examples, local computing device 110 can be part of and/or include an electronic device (or devices) such as a computer system (e.g., a server, a laptop computer, a tablet computer, etc.), a camera system (e.g., a digital camera, an IP camera, a video camera, a security camera, etc.), a telephone system (e.g., a smartphone, a cellular telephone, a conferencing system, etc.), a display device, an XR device such as a head-mounted display (HMD), an IoT (Internet-of-Things) device, or any other suitable electronic device(s).

Further, the components shown in FIG. 2 with respect to local computing device 110 are illustrative examples provided for explanation purposes. In other examples, local computing device 110 can include more or less components than those shown in FIG. 2. While local computing device 110 is shown to include certain components, one of ordinary skill will appreciate that local computing device 110 can include more or fewer components than those shown in FIG. 2. For example, local computing device 110 can include, in some instances, one or more memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 2. An illustrative example of a computing device and/or hardware components that can be implemented with local computing device 110 are described below with respect to FIG. 11.

Figure 3:
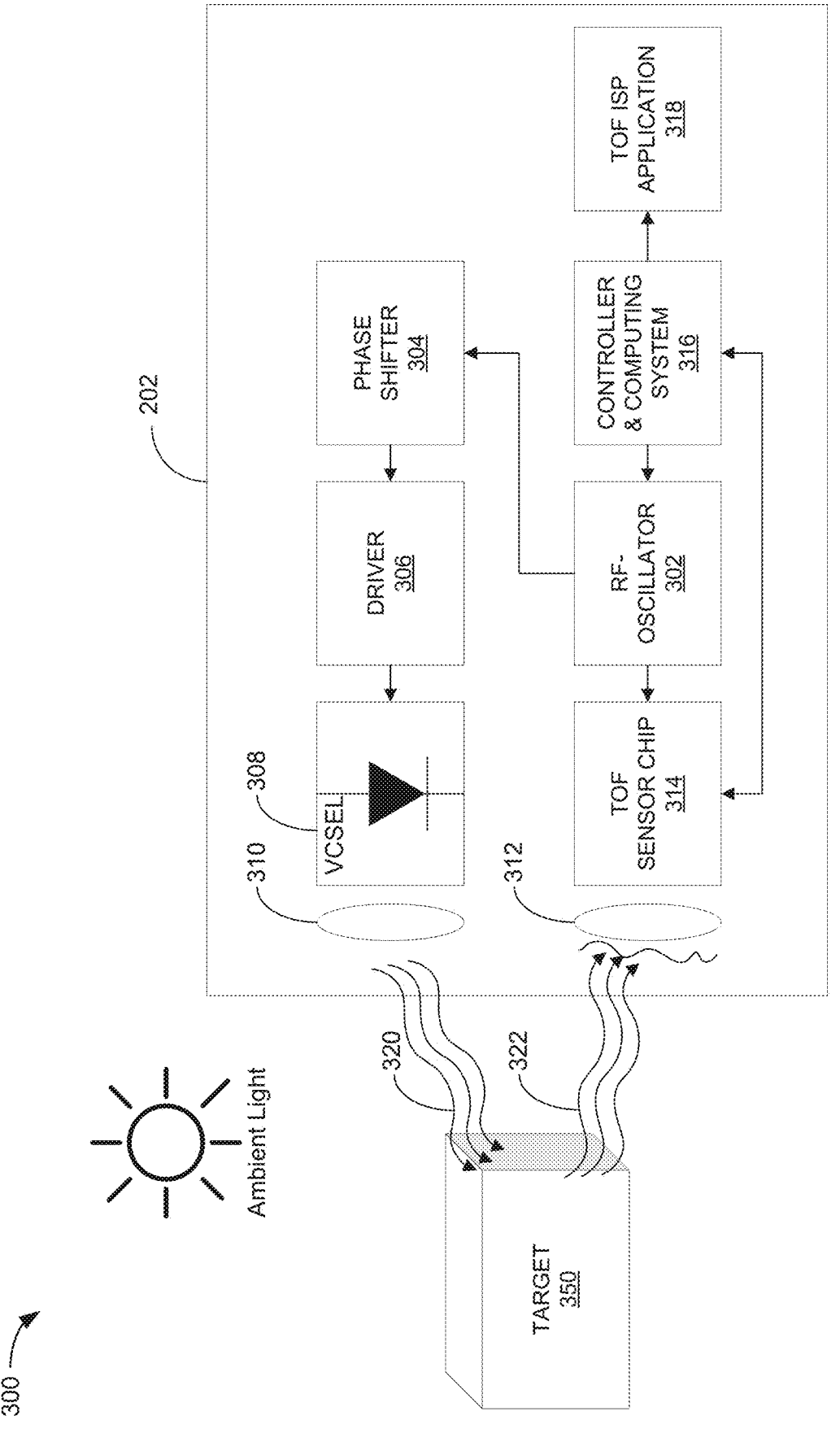
FIG. 3 is a block diagram illustrating an example imaging environment with a Time-of-Flight (ToF) camera system, in accordance with some examples of the present disclosure.

FIG. 3 illustrates an example imaging environment 300 with a three-dimensional (3D) camera system. In this example, the 3D camera system is ToF camera 202 (also referred to as a ToF sensor or ToF camera sensor) described above with respect to FIG. 2. In some examples, ToF camera 202 can be used to implement the systems and techniques described herein. For example, ToF camera 202 can include a range imaging camera system that resolves distance based on the speed of light, a measured time-of-flight of a light signal between the camera and target in the scene for each point of a captured frame.

As explained previously, ToF camera 202 can work by illuminating a scene with a transmitted light 320 (e.g., transmitted signal, modulated output/signal, incident light, or emitted light/signal) and observing (e.g., receiving, capturing or recording, sensing, measuring, analyzing, etc.) a received light 322 (e.g., received signal, backscattered light/signal, or reflected signal/light) that is backscattered (e.g., reflected) by target 350. In the illustrative example of FIG. 3, ToF camera 202 can include a local oscillator clock 302 (e.g., radio frequency (RF) oscillator), a phase shifter 304 at a transmission channel, a driver 306, a light source 308, and a transmit optical system 310.

In some cases, local oscillator clock 302 can include any applicable type of oscillator clock, otherwise referred to as a radio frequency (RF)-oscillator clock. Local oscillator clock 302 can generate a clock signal that can be used to modulate an output signal of ToF camera 202 (e.g., transmitted light 320) and/or to demodulate the ToF pixels on the sensor array (ToF sensor chip 314). In some aspects, phase shifter 304 can receive the clock signal generated by local oscillator clock 302 and delay it for purposes of creating a phase adjusted input. While phase shifter 304 is shown as being implemented on the transmitting channel, in various examples, phase shifter 304 can be implemented in the receiving channel of ToF camera 202. For example, phase shifter 304 can be implemented in the receiving channel to affect modulation of the signal generated by light source 308. In another example, phase shifter 304 can be implemented between ToF sensor chip 314 and local oscillator clock 302 or directly integrated with the ToF sensor chip 314.

In some examples, driver 306 can receive the phase adjusted clock signal from phase shifter 304 and modulate the signal based on the phase adjusted clock signal to generate modulated output (e.g., transmitted light 320) from light source 308. In some examples, the illumination of ToF camera 202 can be generated by light source 308. Light source 308 can include, for example and without limitation, a solid-state laser (e.g., a laser diode (LD), a vertical-cavity surface-emitting laser (VCSEL), etc.), a light-emitting diode (LED), etc.), a lamp, and/or any other light emitter or light emitting device.

In some aspects, transmitted light 320 (e.g., modulated output from light source 308) can pass through transmit optical system 310 and be transmitted towards a target 350 in a scene. In some cases, target 350 can include any type of target, surface, interface, and/or object such as, for example and without limitation, a human, an animal, a vehicle, a tree, a structure (e.g., a building, a wall, a shelter such as a bus stop shelter, etc.), an object, a surface, a device, a material with a refractive index that allows at least some light (e.g., transmitted light 320, ambient light, etc.) to be reflected/backscattered from the material, and/or any other target, surface, interface, and/or object in a scene.

In the illustrative example of FIG. 3, ToF camera 202 includes a receiving optical system 312, a ToF sensor chip 314, and a controller and computing system 316 supporting an application 318. In the example environment 300, when transmitted light 320 (e.g., an RF modulated infrared (IR) optical signal with an equal wave front) interacts with target 350, at least some of transmitted light 320 can be reflected back towards ToF camera 202 as a received light 322 (e.g., backscattered signal, light incident on ToF camera 202, etc.).

In some examples, received light 322 passes through receiving optical system 312 to ToF sensor chip 314. In some cases, received light 322 can include the RF modulated IR optical signal backscattered with different time-of-flight delays. The different ToF delays in received light 322 can represent, or otherwise encode, 3D information of target 350. As used herein, 3D information of a target can include applicable information defining characteristics of a target in 3D space. For example, 3D information of a target can include range information that describes a distance between a reference and the target or a portion of the target.

In some examples, the light that is received by and/or enters (e.g., the light incident on) receiving optical system 312 and/or ToF sensor chip 314 can include a reflected component. In other examples, the light that is received by and/or enters (e.g., the light incident on) entering receiving optical system 312 and/or ToF sensor chip 314 can include a reflected component as well as an ambient component. In some examples, the distance (e.g., depth) information may be embedded in, measured from, and/or defined by the reflected component or may only be embedded in the reflected component. As such, a certain amount of (and/or any amount of) an ambient component can reduce the signal-to-noise ratio (SNR).

In some examples, ToF depth image processing methods can include collecting correlation samples (CSs) to calculate a phase estimate. For example, correlation samples of a ToF pixel and/or image can be collected at one or more time points, such as sequential time points, and at different phase shift/offset conditions. The signal strength of the correlation samples varies with the different phase shifts. As such, these samples output from the ToF pixel and/or image have different values.

In some cases, ToF sensor chip 314 can detect varying ToF delays in received light 322. As follows, ToF sensor chip 314 can communicate with controller and computing system 316 to process the ToF delays and generate 3D information based on the ToF delays.

In some aspects, controller and computing system 316 support application 318 that performs further signal processing and controls various functional aspects, for example, based on the 3D information. For example, application 318 can control or facilitate control of an AV (e.g., AV 102 as illustrated in FIG. 1) based on the 3D information.

As explained, the light from a modulated light source (e.g., transmitted light 320) is backscattered by target 350 in the field of view of ToF camera 202, and the phase shift between transmitted light 320 and received light 322 can be measured. By measuring the phase shift at multiple modulation frequencies, a depth value for each pixel can be calculated. In one illustrative example, based on a continuous-wave (CW) method, ToF camera 202 can take multiple samples per measurement, e.g., with each sample phasestepped by, e.g., 90 degrees, for a total of four samples (however, the present technology is not limited to 4 phased-stepped implementation). Using this technique, ToF camera 202 can calculate the phase angle between illumination and reflection and the distance associated with target 350. In some cases, a reflected amplitude (A) and an offset (B) can have an impact on the depth measurement precision or accuracy. Moreover, ToF camera 202 can approximate the depth measurement variance. In some cases, the reflected amplitude (A) can be a function of the optical power, and the offset (B) can be a function of the ambient light and residual system offset.

When received light 322 arrives at a ToF sensor of ToF camera 202 (e.g., through a lens of ToF camera 202), each pixel of the ToF sensor demodulates the RF-modulated light 322 generated by electrons and concurrently integrates the photogenerated charges in pixel capacitors at multiple phase shift steps or phase offsets at multiple phase windows. In this way, ToF camera 202 can acquire a set of raw ToF data. ToF camera 202 can then process the raw ToF data. For example, ToF camera 202 can demodulate the time-of-flight and use the time-of-flight to calculate the distance from ToF camera 202 to target 350. In some cases, ToF camera 202 can also generate an amplitude image of active light (A) and a grayscale image of passive light or offset part (B) of the active light.

In some examples, the distance demodulation can establish the basis for estimating depth by ToF camera 202. In some cases, there can be multiple capacitors and multiple integral windows with a phase difference $\pi$ under each pixel of the ToF sensor of ToF camera 202. In one sampling period, the pixel can be designed with electronics and capacitors that can process and accumulate the differential charge or samples. This process is called differential correlation sampling (DCS), and may be used as a method to cancel or minimize the offset (B) from the correlation results. In an example implementation of a 4-DCS method, the capacitors can sample a signal four times at four phases such as 0°, 90°, 180° and 270° phases. ToF camera 202 can use the sample results (e.g., DCS1, DCS2, DCS3, DCS4 sampled at different phase shifts between transmitted light 320 and received light 322 to calculate the distance of target 350 (relative to the ToF camera 202) based on the phase shift.

Equation (1) below provides an example for calculating DCS (e.g., under approximately ideal conditions), in which $DCS_k$ corresponds to the signal used for distance evaluation for k=0, 1, 2, 3: A corresponds to the ToF amplitude: $\varphi_d$ corresponds to the phase of the signal; and $\psi_k$ corresponds to the phase of f sets (e.g., 0°, 90°, 180° and) 270°.

$$DCS_k = A \cdot \cos(\varphi_d - \psi_k); k = 0, 1, 2, 3 \qquad (1)$$

In some examples, ToF camera 202 can measure a distance for every pixel to generate a depth map. In some cases, a depth map can include a collection of 3D points (e.g., each point is also known as a voxel). In some cases, the depth map can be rendered in a two-dimensional (2D) representation or image. In other cases, a depth map can be rendered in a 3D space as a collection of points or point cloud. In some examples, the 3D points can be mathematically connected to form a mesh onto which a texture surface can be mapped.

Figure 4:
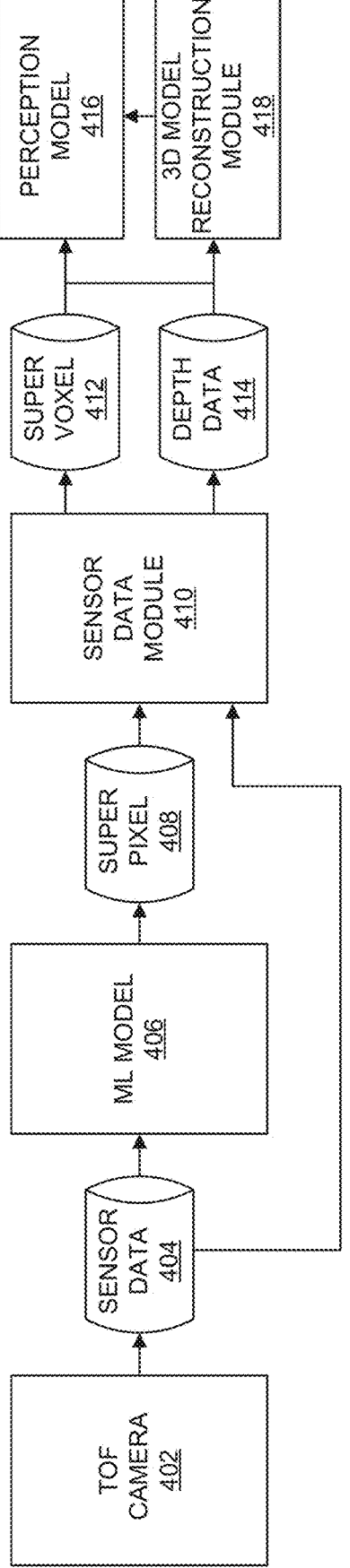
FIG. 4 is a block diagram illustrating a system for processing image data from a ToF camera to identify super pixels and super voxels, in accordance with some examples of the present disclosure.

FIG. 4 illustrates an example of a system 400 that can be used to process ToF sensor data to identify super pixels. In some aspects, the super pixels can be used to identify super voxels for use by different applications (e.g., for operating an autonomous vehicle). As used herein, a super pixel can correspond to a grouping of three or more pixels with similar features that include 6-dimensional such as two-dimensional spatial location (e.g., x, y coordinates), two-dimensional spatial orientation (e.g., azimuth and elevation), and two-dimensional passive and active signal intensities. A super-voxel can correspond to a grouping of three or more voxels with similar features that include 7-dimensional data such as three-dimensional spatial location (e.g., x, y, z coordinates), two-dimensional spatial orientation (e.g., azimuth and elevation), and two-dimensional passive and active signal intensities.

In some aspects, system 400 can include ToF camera 402. In some examples, ToF camera 402 can correspond to ToF camera 202 and/or to a sensor that is part of sensor systems 104-108. In some cases, ToF camera 402 can capture sensor data 404. As noted above, sensor data 404 can include data that is captured by each of the pixels in ToF camera 402. For example, sensor data 404 can include a depth map that is a collection of 3D points. In some cases, sensor data 404 can include a depth map that is rendered in a two-dimensional representation or space. In some aspects, sensor data 404 can include a collection of points or a point cloud. In some examples, sensor data 404 can include a mesh that is based on the point cloud onto which a texture surface can be mapped. In some aspects, sensor data 404 can include an amplitude image of active light (A) and a grayscale image of passive light or offset part (B) of the active light.

In some cases, all or a portion of sensor data 404 can be provided to a machine learning (ML) model such as ML model 406. In some examples, ML model 406 can be trained to identify, categorize, and/or segment the objects or scene elements that are captured by ToF camera 402 with sensor data 404. In particular, ML model 406 can process two-dimensional sensor data (e.g., grayscale image) and label and segment scene elements within the two-dimensional data. In some aspects, ML model 406 can identify a group of pixels (e.g., a super pixel 408) that is associated with a scene element. That is, super pixel 408 can identify a group of pixels (e.g., pixel indices) within the two-dimensional data that correspond to a scene element. In some cases, a scene element can include any object or thing present within a scene that is captured by sensor data 404. By way of example, scene elements can include pedestrians, vehicles, signs, traffic signals, ground surfaces, curbs, speedbumps, road paint, animals, etc.

In some configurations, super pixel 408 can be provided to a sensor data module 410. In some aspects, sensor data module 410 can be part of ToF camera 402 and/or sensor data module 410 can be implemented as part of a module, model, algorithm, component etc. that is coupled to ToF camera 402. For instance, sensor data module 410 can be part of compute components 210 and/or data processing engine 220.

In some instances, sensor data module 410 can receive super pixel 408 from ML model 406 and sensor data 404 from ToF camera 402. In some aspects, sensor data module 410 can use super pixel 408 to identify a group of voxels (e.g., super voxel 412) corresponding to a scene element within a depth map (e.g., 3D depth map and/or a point cloud). For example, sensor data module 410 can use the pixel indices associated with super pixel 408 to identify super voxel 412. That is, the two-dimensional data (e.g., grayscale or active) is intrinsically aligned with the three-dimensional data (e.g., depth map) because the two-dimensional data and the three-dimensional data are provided as part of sensor data 404 by ToF camera 402. The pixel alignment between the two-dimensional data and the three-dimensional data can be maintained in a static condition or a motion calibrated condition. Consequently, sensor data module 410 can index super voxel 412 on the depth map using the same index as super pixel 408 within the two-dimensional data.

In some aspects, sensor data module 410 can use super voxel 412 to determine depth data 414. In some instances, depth data 414 can include the distance or range between ToF camera 402 and the scene element that is associated with super voxel 412. By using super voxel 412, the distance or range calculation can be completed more accurately than by relying on a single voxel.

In some examples, sensor data module 410 can use super voxel 412 to implement one or more applications or algorithms that can be used by an autonomous vehicle (e.g., AV 102). In one illustrative example, sensor data module 410 may use super voxel 412 to perform ground segmentation. That is, super voxel 412 may include multiple super voxels that correspond to portions of a ground surface and each super voxel may have a corresponding spatial orientation vector. In some examples, the respective spatial orientation vectors may be compared to a norm vector to select super voxels with the least amount of deviation from the norm. In some aspects, the selected super voxels can be used to represent the ground surface or ground plane.

In another illustrative example, sensor data module 410 can use super voxel 412 to perform optical pitch roll monitoring for an autonomous vehicle. For instance, as the AV is in motion, a ground norm may vary with respect to the reference ground (e.g., based on ground segmentation) due to curves, braking, road conditions, etc. The variance can be measured and used to calculate pitch and roll angles as the AV is in motion.

In another illustrative example, sensor data module 410 can use super voxel 412 to detect objects or scene elements that are close to the ground such as a speedbump or a pedestrian or pet laying on the street. For instance, ML model 406 can process two-dimensional image data to identify scene elements and corresponding super pixels that include a speed bump and a ground surface. Sensor data module 410 can use the super pixels to identify super voxels corresponding to the speed bump and the ground surface.

In some examples, the output of sensor data module 410 can be provided to a perception model 416 and/or to 3D model reconstruction module 418. For example, super voxel 412 and/or depth data 414 (e.g., 3D depth map and/or point cloud) can be provided to perception model 416 for further processing (e.g., performing further perception tasks for navigating AV 102). In some examples, perception model 416 can correspond to perception stack 112.

In some cases, 3D model reconstruction module 418 can correspond to an algorithm and/or an ML model that can be used to reconstruct a depth map or point cloud. For example, 3D model reconstruction module 418 can be used to place models of scene elements such as cars, streets, the sky, etc. to generate a high-density point cloud (e.g., improved visualization). In some aspects, 3D model reconstruction module 418 can be used to compensate for invalidated pixels (e.g., due to noise). For instance, 3D model reconstruction module 418 can place the model of a car at a location that is based on a super voxel that includes one or more invalidated pixels. In some configurations, the output of 3D model reconstruction module 418 can also be provided to perception model 416. That is, perception model 416 can use the original 3D point cloud and/or the reconstructed model to implement additional perception related tasks.

Figure 5:
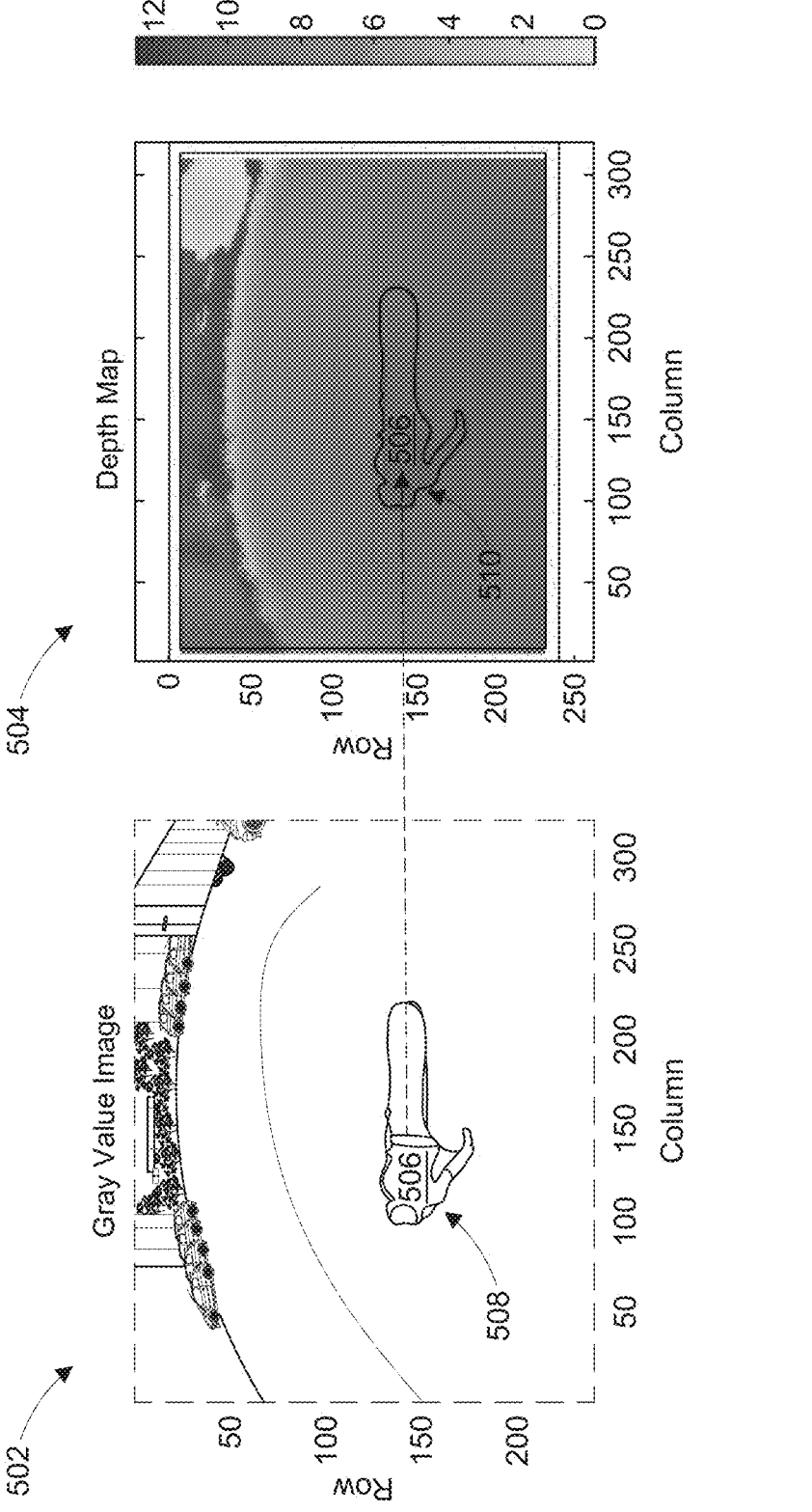
FIG. 5 illustrates an example mapping of a super pixel to a super voxel, in accordance with some examples of the present disclosure.

FIG. 5 illustrates an example of identifying and mapping a super pixel to a super voxel that may be performed by one or more components from FIG. 4. For example, ML model 406 may receive grayscale image 502 (e.g., as part of sensor data 404). In some aspects, ML model 406 may identify one or more scene elements within grayscale image 502. For instance, ML model 406 may identify person 506. In some cases, ML model 406 may identify a group of pixels (e.g., super pixel 508) that are associated with person 506.

In some examples, super pixel 508 can be provided to a sensor data module (e.g., sensor data module 410) for indexing super voxel 510 within depth map 504. In some cases, the indices from super pixel 508 can be the same as the indices of super voxel 510 because the sensor data is intrinsically aligned.

Figure 6:
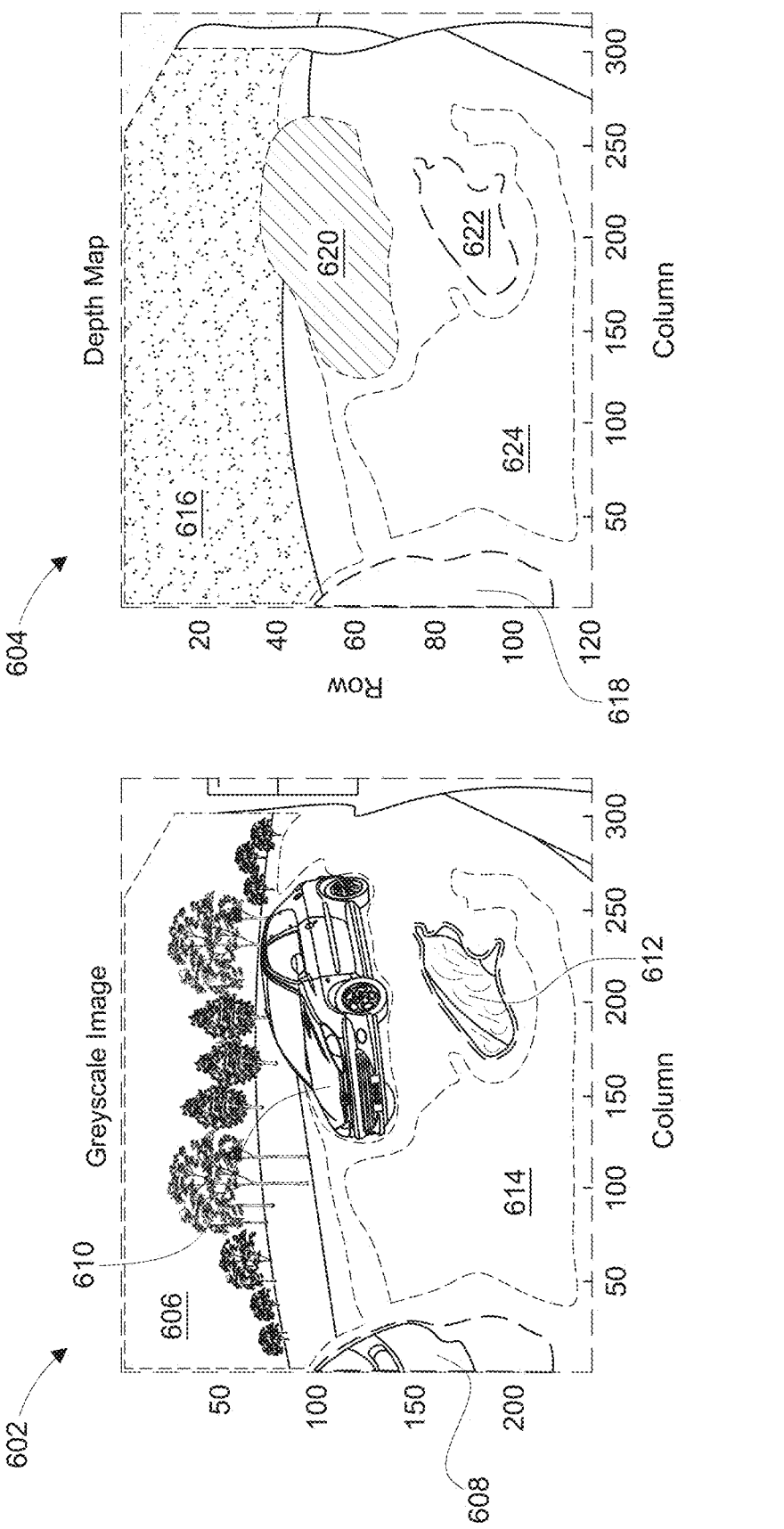
FIG. 6 illustrates another example mapping of a super pixel to a super voxel, in accordance with some examples of the present disclosure.

FIG. 6 illustrates another example of identifying and mapping super pixels to super voxels. In some aspects, an ML model (e.g., ML model 406) can process grayscale image 602 and identify, classify, and segment the scene elements. For instance, ML model 406 can identify super pixel 606 for a scene element of the sky; super pixel 608 for scene element of a vehicle rear; super pixel 610 for a scene element of a vehicle; super pixel 612 for a scene element of a person, and/or super pixel 614 for a scene element of a ground surface. In some examples, the super pixels associated with the scene elements identified within grayscale image 602 can be used to identify corresponding super voxels within depth map 604. That is, a sensor data module (e.g., sensor data module 410) can identify super voxel 616 for sky, super voxel 618 for vehicle rear, super voxel 620 for a vehicle, super voxel 622 for a person, and/or super voxel 624 for a ground surface.

Figure 7:
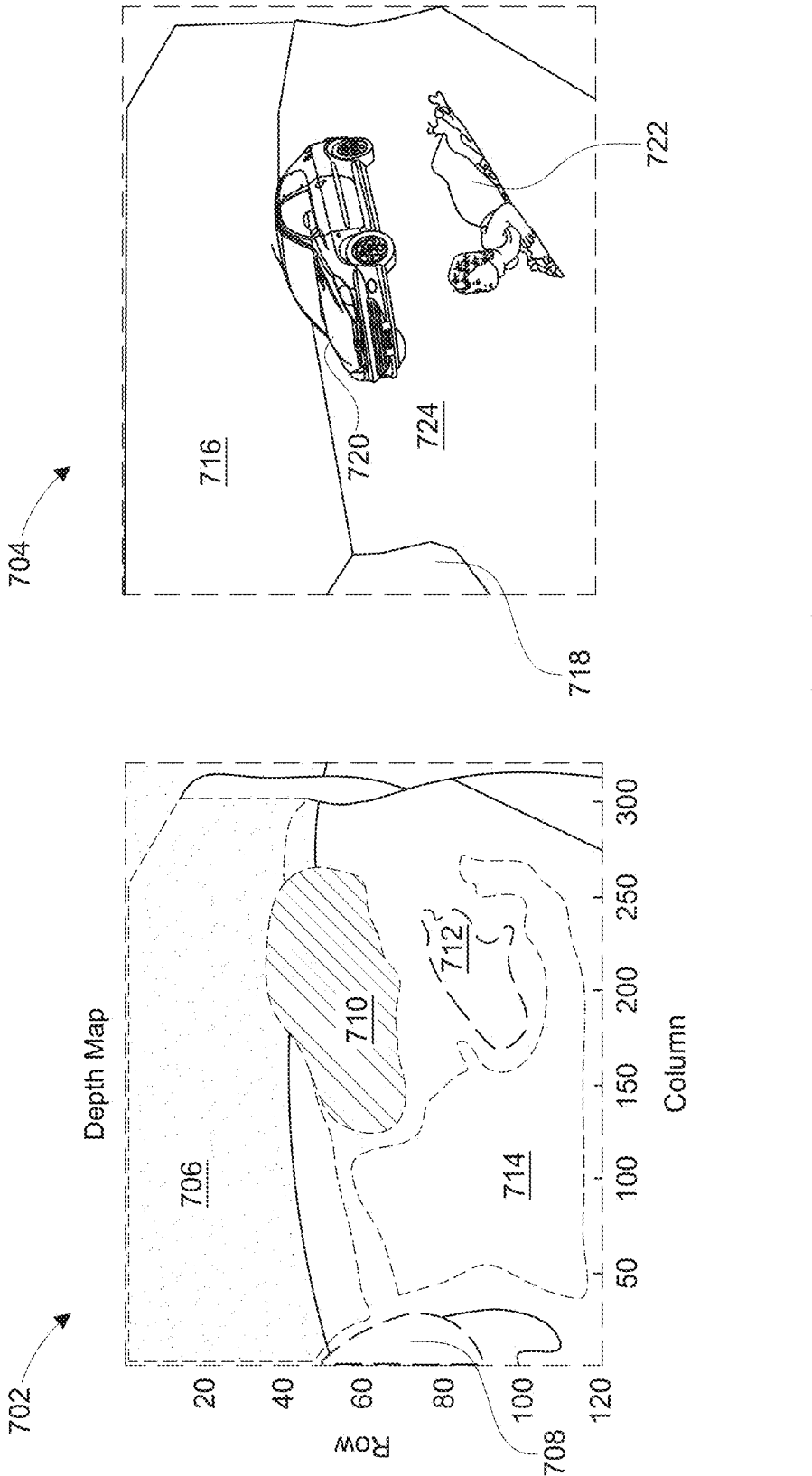
FIG. 7 illustrates an example reconstruction of a 3D model using super voxels, in accordance with some examples of the present disclosure.

FIG. 7 illustrates an example of 3D model reconstruction that may be performed by a 3D model reconstruction module 418. In some aspects, 3D model reconstruction module 418 can receive a depth map 702 or a point cloud that includes one or more super voxels. As illustrated, depth map 702 includes a super voxel 706 that is associated with the sky; a super voxel 708 that is associated with the rear portion of a vehicle; a super voxel 710 that is associated with a vehicle; a super voxel 712 that is associated with a person on the ground; and a super voxel 714 that is associated with a ground surface.

In some examples, 3D model reconstruction module 418 can generate a reconstructed model 704 by inputting models at the locations defined by the super voxels. For instance, sky model 716 can be place at location corresponding to super voxel 706; car rear model 718 can be placed at location corresponding to super voxel 708: car model 720 can be place at location corresponding to super voxel 710; person model 722 can be place at location corresponding to super voxel 712; and/or ground surface model 724 can be place at location corresponding to super voxel 714.

Figure 8:
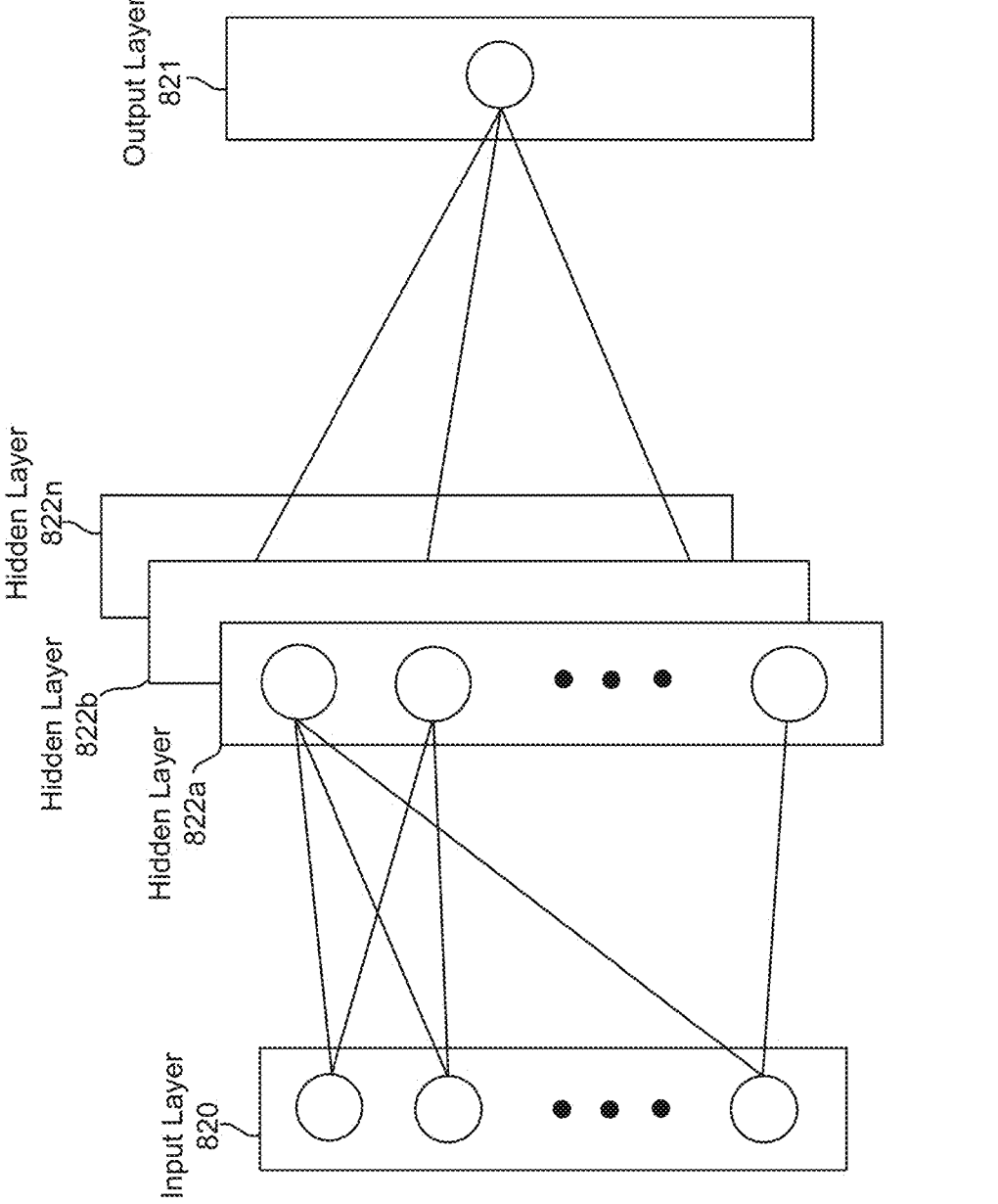
FIG. 8 illustrates an example of a deep learning neural network that can be used to implement aspects of image data processing including identifying super pixels and/or super voxels, according to some aspects of the present disclosure.

In FIG. 8, the disclosure now turns to a further discussion of models that can be used through the environments and techniques described herein. FIG. 8 is an example of a deep learning neural network 800 that can be used to implement all, or a portion of the systems and techniques described herein as discussed above (e.g., neural network 800 can be used to implement aspects of ToF camera 202). For example, an input layer 820 can be configured to receive one or more measurements or parameters associated with a ToF sensor such as distance, phase, active light, grayscale of the environmental light, etc. Neural network 800 includes multiple hidden layers 822a, 822b, through 822n. The hidden layers

822a, 822b, through 822n include "n" number of hidden layers, where "n" is an integer greater than or equal to one. The number of hidden layers can be made to include as many layers as needed for the given application. Neural network 800 further includes an output layer 821 that provides an output resulting from the processing performed by the hidden layers 822a, 822b, through 822n. For instance, the output may include a super pixel (e.g., indices corresponding to a group of pixels) that is associated with a scene element that is identified within a two-dimensional image.

Neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the first hidden layer 822a can transform the information of each input node by applying activation functions to the input node information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 821, at which an output is provided. In some cases, while nodes in the neural network 800 are shown as having multiple output lines, a node can have a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822a, 822b, through 822n in order to provide the output through the output layer 821.

In some cases, the neural network 800 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 800 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2} (target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 800 can perform a backward pass by determining which inputs (weights) most contributed to the loss of the network and can adjust the weights so that the loss decreases and is eventually minimized.

The neural network 800 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 800 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

FIG. 9 illustrates an example of a process 900 for identifying super pixels and associating them with super voxels using sensor data obtained from a ToF camera. Although the process 900 depicts a particular sequence of operations, the sequence may be altered without departing from the scope of the present disclosure. For example, some of the operations depicted may be performed in parallel or in a different sequence that does not materially affect the function of process 900. In other examples, different components of an example device or system that implements process 900 may perform functions at substantially the same time or in a specific sequence.

At step 902, the process 900 includes receiving a depth map and a two-dimensional image that each correspond to an image frame captured by a time-of-flight (ToF) sensor. For instance, ML model 406 can receive grayscale image

502 and depth map 504 corresponding to an image frame captured by ToF camera 402. In some aspects, the depth map can include a point cloud.

At step 904, the process 900 includes identifying a plurality of pixels within the two-dimensional image that correspond to at least one scene element. In some aspects, identifying the plurality of pixels within the two-dimensional image can include processing the two-dimensional image using a machine learning model that is configured to identify the at least one scene element. For example, ML model 406 may identify a plurality of pixels within grayscale image 502 that correspond to person 506. In some aspects, the at least one scene element can include at least one of a ground surface, a pedestrian, a vehicle, a sign, and a traffic signal.

At step 906, the process 900 includes identifying, based on the plurality of pixels, a plurality of voxels within the depth map that correspond to the at least one scene element. For instance, sensor data module 410 can identify a plurality of voxels within depth map 504 that correspond to person 506.

At step 908, the process 900 includes grouping the plurality of voxels into a super voxel that corresponds to the at least one scene element. For example, sensor data module 410 can group the plurality of voxels into super voxel 510. In some aspects, the super voxel can include seven-dimensional data comprising three-dimensional spatial data, two-dimensional orientation data, and two-dimensional image data.

In some cases, the process 900 can include determining, based on the super voxel, a distance to the at least one scene element. For example, sensor data module 410 can use super voxel 412 to determine depth data 414.

In some aspects, the process 900 can include sending the distance to the at least one scene element to a perception stack of an autonomous vehicle. For instance, sensor data module 410 can send depth data 414 to perception model 416.

In some configurations, the process 900 can include reconstructing the depth map by placing a model corresponding to the at least one scene element at a location corresponding to the super voxel. For example, 3D model reconstruction module 418 can reconstruct depth map 702 by placing a car model 720 corresponding to the car at the location corresponding to super voxel 710.

In some aspects, the process 900 can include grouping the plurality of pixels into a super pixel that corresponds to the at least one scene element, wherein the super pixel includes six-dimensional data comprising two-dimensional spatial data, two-dimensional orientation data, and two-dimensional image data. For example, ML model 406 can group the pixel associated with an identified scene element into super pixel 408.

Figure 10:
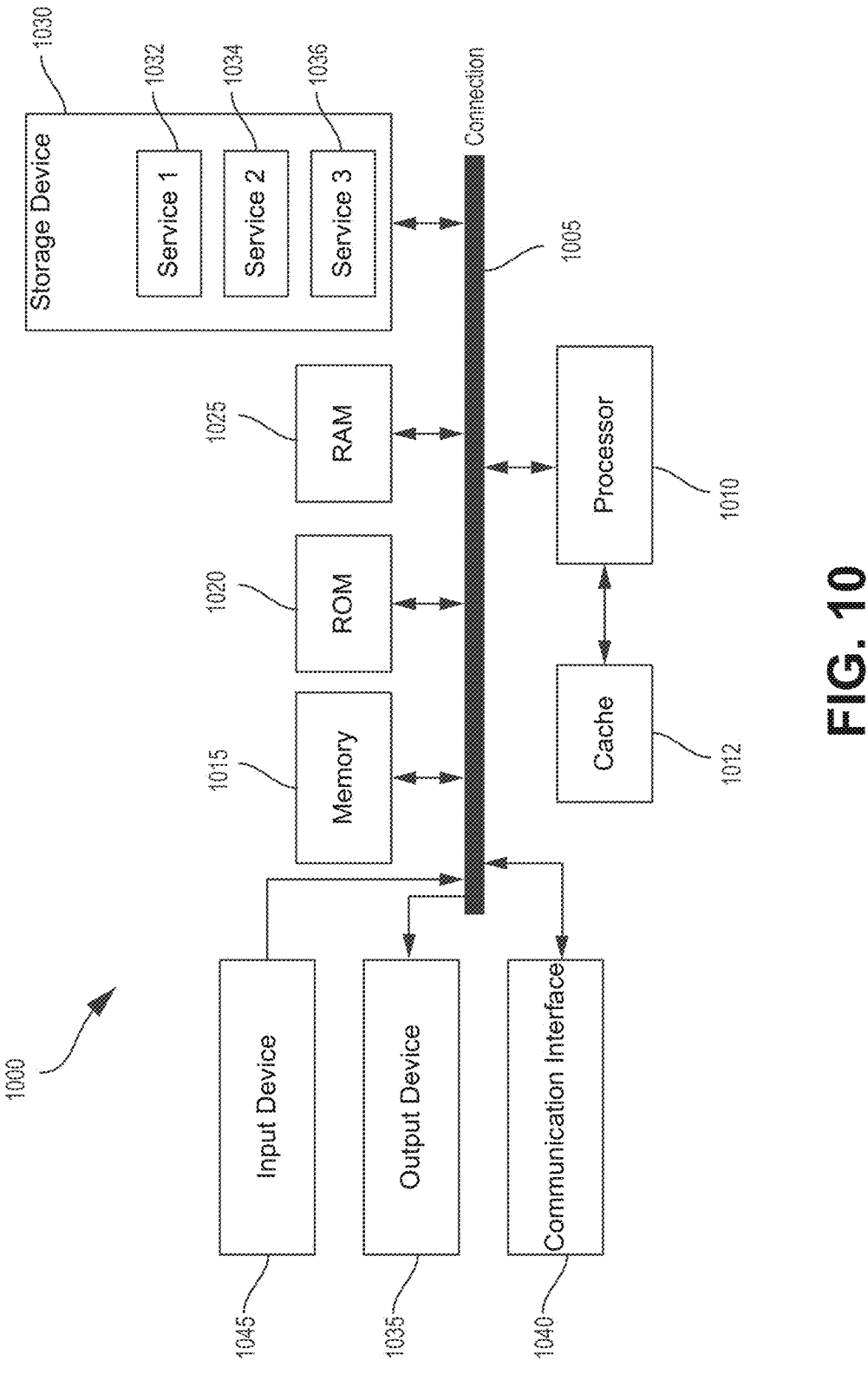
FIG. 10 is a diagram illustrating an example system architecture for implementing certain aspects described herein.

FIG. 10 illustrates an example processor-based system with which some aspects of the subject technology can be implemented. For example, processor-based system 1000 can be any computing device making up internal computing system 110, a passenger device executing the ridehailing application 172, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some examples, computing system 1000 is a distributed system in which the functions described in this disclo-sure can be distributed within a datacenter, multiple data centers, a peer network, etc. In some cases, one or more of the described system components represents many such components each performing some or all of the function for which the component is described. In some aspects, the components can be physical or virtual devices.

Example system 1000 includes at least one processing unit (CPU or processor) 1010 and connection 1005 that couples various system components including system memory 1015, such as read-only memory (ROM) 1020 and random-access memory (RAM) 1025 to processor 1010. Computing system 1000 can include a cache of high-speed memory 1012 connected directly with, in close proximity to, and/or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 can include an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable program-mable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combi-nation thereof.

Storage device 1030 can include software services, serv-ers, services, etc., that when the code that defines such software is executed by the processor 1010, causes the system to perform a function. In some examples, a hardware service that performs a particular function can include the software component stored in a computer-readable medium in connection with the necessary hardware components, such as processor 1010, connection 1005, output device 1035, etc., to carry out the function.

As understood by those of skill in the art, machine-learning techniques can vary depending on the desired implementation. For example, machine-learning schemes can utilize one or more of the following, alone or in combination: hidden Markov models; recurrent neural net-works; convolutional neural networks (CNNs); deep learn-ing; Bayesian symbolic methods; general adversarial net-works (GANs); support vector machines; image registration methods; applicable rule-based system. Where regression algorithms are used, they may include but are not limited to: a Stochastic Gradient Descent Regressor, and/or a Passive Aggressive Regressor, etc.

Machine learning classification models can also be based on clustering algorithms (e.g., a Mini-batch K-means clus-tering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algo-rithm, etc.

Aspects within the scope of the present disclosure may also include tangible and/or non-transitory computer-read-able storage media or devices for carrying or having com-puter-executable instructions or data structures stored thereon. Such tangible computer-readable storage devices can be any available device that can be accessed by a general purpose or special purpose computer, including the func-tional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another commu-nications connection (either hardwired, wireless, or combi-nation thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose com-puter, special-purpose computer, or special-purpose process-ing device to perform a certain function or group of func-tions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program mod-ules represent examples of the program code means for executing steps of the methods disclosed herein. The par-ticular sequence of such executable instructions or associ-ated data structures represents examples of corresponding acts for implementing the functions described in such steps.

Other examples of the disclosure may be practiced in network computing environments with many types of com-puter system configurations, including personal computers, hand-held devices, multi-processor systems, microproces-sor-based or programmable consumer electronics, network PCs, minicomputers, mainframe computers, and the like. Aspects of the disclosure may also be practiced in distrib-uted computing environments where tasks are performed by local and remote processing devices that are linked (either by hardwired links, wireless links, or by a combination thereof) through a communications network. In a distributed computing environment, program modules can be located in both local and remote memory storage devices.

SELECTED EXAMPLES

Illustrative examples of the disclosure include:

Aspect 1. A method comprising: receiving a depth map and a two-dimensional image that each correspond to an image frame captured by a time-of-flight (ToF) sensor; identifying a plurality of pixels within the two-dimensional image that correspond to at least one scene element; identifying, based on the plurality of pixels, a plurality of voxels within the depth map that correspond to the at least one scene element; and grouping the plurality of voxels into a super voxel that corresponds to the at least one scene element.

Aspect 2. The method of Aspect 1, further comprising: determining, based on the super voxel, a distance to the at least one scene element.

Aspect 3. The method of Aspect 2, further comprising: sending the distance to the at least one scene element to a perception stack of an autonomous vehicle.

Aspect 4. The method of any of Aspects 1 to 3, wherein the at least one scene element includes at least one of a ground surface, a pedestrian, a vehicle, a sign, and a traffic signal.

Aspect 5. The method of any of Aspects 1 to 4, wherein identifying the plurality of pixels within the two-dimensional image further comprises: processing the two-dimensional image using a machine learning model that is configured to identify the at least one scene element.

Aspect 6. The method of any of Aspects 1 to 5, further comprising: reconstructing the depth map by placing a model corresponding to the at least one scene element at a location corresponding to the super voxel.

Aspect 7. The method of any of Aspects 1 to 6, wherein the super voxel includes seven-dimensional data comprising three-dimensional spatial data, two-dimensional orientation data, and two-dimensional image data.

Aspect 8. The method of any of Aspects 1 to 7, further comprising: grouping the plurality of pixels into a super pixel that corresponds to the at least one scene element, wherein the super pixel includes six-dimensional data comprising two-dimensional spatial data, two-dimensional orientation data, and two-dimensional image data.

Aspect 9. The method of any of Aspects 1 to 8, wherein the depth map incudes a point cloud.

Aspect 10. An apparatus comprising: at least one memory; and at least one processor coupled to the at least one memory, wherein the at least one processor is configured to perform operations in accordance with any one of Aspects 1 to 9.

Aspect 11. An apparatus comprising means for performing operations in accordance with any one of Aspects 1 to 9.

Aspect 12. A non-transitory computer-readable medium comprising instructions that, when executed by an apparatus, cause the apparatus to perform operations in accordance with any one of Aspects 1 to 9.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A system comprising:
at least one memory comprising instructions; and
at least one processor configured to execute the instructions and cause the at least one processor to:
 receive a depth map and a two-dimensional image that each correspond to an image frame captured by a time-of-flight (ToF) sensor;
 identify a plurality of pixels within the two-dimensional image that correspond to at least one scene element;
 for each respective pixel of the identified plurality of pixels, determine, from the depth map, a corresponding depth value;
 identify, based on each corresponding depth value, a plurality of voxels within the depth map that correspond to the at least one scene element; and
 group the plurality of voxels into a super voxel that corresponds to the at least one scene element.

2. The system of claim 1, wherein the at least one processor is further configured to:
determine, based on the super voxel, a distance to the at least one scene element.

3. The system of claim 2, wherein the at least one processor is further configured to:
send the distance to the at least one scene element to a perception stack of an autonomous vehicle.

4. The system of claim 1, wherein the at least one scene element includes at least one of a ground surface, a pedestrian, a vehicle, a sign, and a traffic signal.

5. The system of claim 1, wherein to identify the plurality of pixels within the two-dimensional image the at least one processor is further configured to:
process the two-dimensional image using a machine learning model that is configured to identify the at least one scene element.

6. The system of claim 1, wherein the at least one processor is further configured to:
reconstruct the depth map by placing a model corresponding to the at least one scene element at a location corresponding to the super voxel.

7. The system of claim 1, wherein the super voxel includes seven-dimensional data comprising three-dimensional spatial data, two-dimensional orientation data, and two-dimensional image data.

8. The system of claim 1, wherein the at least one processor is further configured to:
group the plurality of pixels into a super pixel that corresponds to the at least one scene element, wherein the super pixel includes six-dimensional data comprising two-dimensional spatial data, two-dimensional orientation data, and two-dimensional image data.

9. The system of claim 1, wherein the depth map includes a point cloud.

10. A method comprising:
receiving a depth map and a two-dimensional image that each correspond to an image frame captured by a time-of-flight (ToF) sensor;
identifying a plurality of pixels within the two-dimensional image that correspond to at least one scene element;
for each respective pixel of the identified plurality of pixels, determining, from the depth map, a corresponding depth value;

identifying, based on each corresponding depth value, a plurality of voxels within the depth map that correspond to the at least one scene element; and grouping the plurality of voxels into a super voxel that corresponds to the at least one scene element.

11. The method of claim 10, further comprising:

determining, based on the super voxel, a distance to the at least one scene element.

12. The method of claim 11, further comprising:

sending the distance to the at least one scene element to a perception stack of an autonomous vehicle.

13. The method of claim 10, wherein the at least one scene element includes at least one of a ground surface, a pedestrian, a vehicle, a sign, and a traffic signal.

14. The method of claim 10, wherein identifying the plurality of pixels within the two-dimensional image further comprises:

processing the two-dimensional image using a machine learning model that is configured to identify the at least one scene element.

15. The method of claim 10, further comprising:

reconstructing the depth map by placing a model corresponding to the at least one scene element at a location corresponding to the super voxel.

16. The method of claim 10, wherein the super voxel includes seven-dimensional data comprising three-dimensional spatial data, two-dimensional orientation data, and two-dimensional image data.

17. The method of claim 10, further comprising:

grouping the plurality of pixels into a super pixel that corresponds to the at least one scene element, wherein the super pixel includes six-dimensional data comprising two-dimensional spatial data, two-dimensional orientation data, and two-dimensional image data.

18. The method of claim 10, wherein the depth map includes a point cloud.

19. Non-transitory computer-readable media comprising instructions stored thereon which, when executed are configured to cause a computer or processor to:

receive a depth map and a two-dimensional image that each correspond to an image frame captured by a time-of-flight (ToF) sensor;

identify a plurality of pixels within the two-dimensional image that correspond to at least one scene element;

for each respective pixel of the identified plurality of pixels, determine, from the depth map, a corresponding depth value;

identify, based on each corresponding depth value, a plurality of voxels within the depth map that correspond to the at least one scene element; and group the plurality of voxels into a super voxel that corresponds to the at least one scene element.

20. The non-transitory computer-readable media of claim 19, comprising further instructions configured to cause the computer or the processor to:

determine, based on the super voxel, a distance to the at least one scene element; and send the distance to the at least one scene element to a perception stack of an autonomous vehicle.

* * * * *